Dec. 4, 1951  V. S. PASCHIS  2,577,032
PIE EDGE CRIMPER
Filed Sept. 22, 1947

Inventor
Victoria S. Paschis

By Clarence A. O'Brien
and Harvey B. Jacobson
Attorneys

Patented Dec. 4, 1951

2,577,032

UNITED STATES PATENT OFFICE 2,577,032

PIE EDGE CRIMPER

Victoria S. Paschis, East Vandergrift, Pa., assignor of one-half to James Anthony Paschis, Sr., East Vandergrift, Pa.

Application September 22, 1947, Serial No. 775,504

1 Claim. (Cl. 107—49)

The present invention relates to what is believed to be a novel and improved pie dough crimper and has more specific reference to a simple and expedient hand tool for use in the home kitchen and elsewhere, the overall appearance of the tool being that of a pair of tongs.

Briefly, the preferred embodiment of the invention comprises simple light-weight tongs made from suitable metal or plastic materials and characterized by a resilient handle with duplicate limbs movable toward and from each other, the free end portions of the limbs terminating in jaws and said jaws being corrugated and otherwise made to squeeze the dough-rim therebetween to impart a corrugated or zigzag formation to said rim.

One object of the invention is to provide a simple jaw-equipped tool of the type specified wherein the handle means and jaws take positions at right angles to the bottom of the dough in the baking pan, the jaws and handle limbs straddling the dough-rim in a manner to cause the rim to stand upright, that is, vertical in relation to the horizontal bottom and to give said rim an unusual and highly decorative finish once the complete pie is baked.

Although the invention appertains to a tool usable for zigzagging a vertical dough-rim for a single ply or layer of dough, it is to be understood that where two layers of dough are employed to form an all-enclosed pie, the crimper may be used for adjoining the coacting marginal edges of the two layers, the bottom and the top, to adjoin same and, at the same time, to impart the vertical zigzag crimping effect.

It is of significance, it is believed, to point out at the outset that I am aware that corrugated dough and pie crust crimpers are not new. As a matter of fact, there are tools on the market which not only crimp but also cut and trim at the same time. These tools usually act on the coacting marginal edge portions of the top and bottom crusts alike and the crimping result is horizontal, that is, in approximately the same plane as the top crust. It follows that one of the principal objects here is to obtain the crimping effect at right angles to what is usually accomplished, making it possible to form an endless vertical rim on either an open or closed face pie, whereby to attain the appearance accomplishments already alluded to.

Referring now to the drawings by distinguishing reference numerals:

Referring now to the figures and the parts thereof by like numerals and lead lines, it is to be pointed out that the tool is of one-piece form and this is advantageous in that it is possible to strike out the entire complemental portions from a single sheet of stock. Either metal or plastic may be used in constructing the finished tool.

More specifically, the jaws are denoted by the numerals 5 and 6 and the handle means is denoted at 7. The jaws are in the form of duplicate, substantially rectangular plates and these are disposed in opposed, substantial parallelism and are arcuately bent in a longitudinal direction. Thus, the jaws may be said to be of arcuate or segmental form. In addition, the jaws are each bent upon themselves and corrugated to provide a plurality of corrugations 8 which, on the respective jaws, properly nest together to attain the desired dough-clasping and punching results. The intermediate portions of the respective plates or jaws are extended into flute formations, as at 8a, where they are integrated with the complemental limbs 9 and 10 of the handle means. The bight or bend 10a of the handle is sufficiently springy to provide the desired elastic and resilient properties. The tendency of the limbs is to swing apart and this constantly separates the jaws. Therefore, by simply pressing the jaws together somewhat as is done with the handling of candy tongs or the like, and engaging the jaws with the rim of dough, the desired crimping results are readily obtained.

Figure 1:
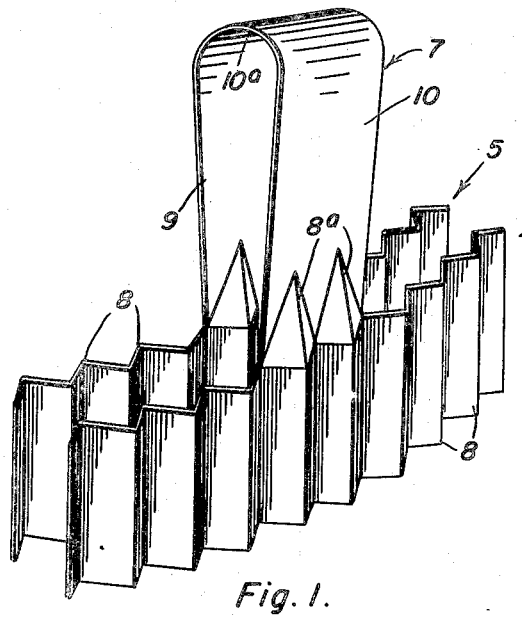
Figure 1 is a perspective view of a pie crust or dough crimping tool or implement constructed in accordance with the principles of the present invention.
Figure 2:
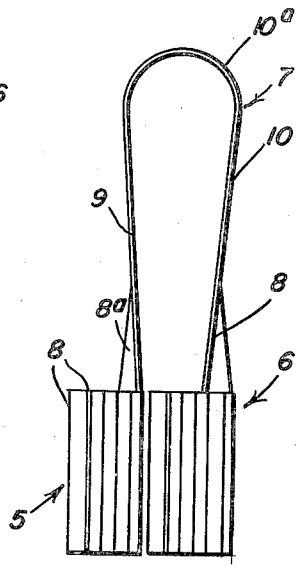
Figure 2 is an end view of same, that is, a view observing Figure 1 in a direction from, let us say, left to right.
Figure 3:
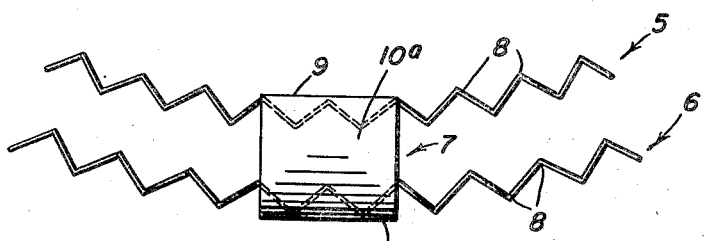
Figure 3 is a top plan view of the structure seen in Figures 1 and 2.
Figure 4:
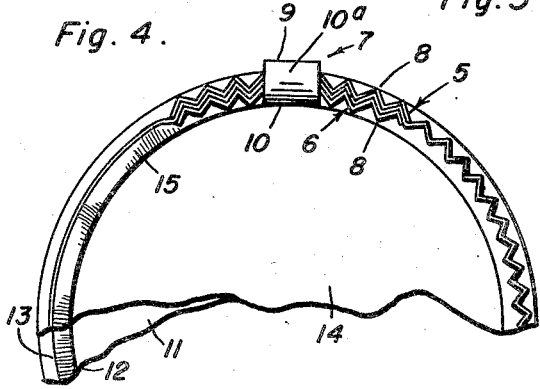
Figure 4 is a view on a smaller scale and of a fragmentary type showing an open face pie in the making and illustrating the pie plate or pan, the dough or crust, and the crimping tool in the manner in which it is used.

Referring to Figure 4, we see a pie plate or pan 11 having a marginal flange 12 defining a rim and the rim having a marginally surrounding lip 13. Here we see an open face pie in the making and the bottom crust or dough is plastered flat in the pan and is denoted at 14 and the rim of the dough is indicated at 15. The rim is sufficiently high above the rim of the pan that the protruding or projecting edge portion is available for crimping. Not only is the dough rim thus crimped vertical to the horizontal surface 14, but a decorative result is obtained at the same time. By making a relatively deep rim, it will serve to wall in and retain excessive fruit juices or other liquid contents of the pie, as is obvious.

It is perhaps unnecessary to repeat the thought previously expressed, and that is in reference to using two crusts for an entirely closed pie shell, wherein it is desired to seal the marginal edge portions of the crusts and to crimp same simultaneously. Accomplishing this is what is accomplished in many types of pie crimping tools, but in the instant case when the two edges are joined together, the juncture becomes an upstanding rim or lip which is vertical to the top of the pie and produces an effect which is new, so far as I am aware.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A pie dough crimper comprising a one-piece pair of tongs embodying a resilient U-shaped handle including a pair of opposed flexible limbs and an interconnecting bight portion, said bight portion being springy and normally serving to spread the limbs apart, said limbs being provided at their free spreadable ends with opposed duplicate rectangular plates, the longitudinal axes of said plates being at right angles to the longitudinal axes of said limbs, and said plates being arcuately bowed and corrugated, the corrugations being transverse to the plates and running in directions substantially parallel to the longitudinal axes of said limbs so as to permit an upstanding marginal edge portion of the sheet of dough to be crimped and to assume a position vertical to the main body of said sheet of dough.

VICTORIA S. PASCHIS.

REFERENCES CITED

The following references are of record in the file of this patent:

UNITED STATES PATENTS

| Number | Name | Date |
|---|---|---|
| 260,369 | Camp | July 4, 1882 |
| 554,502 | Belden | Feb. 11, 1896 |
| 987,525 | Wing | Mar. 21, 1911 |
| 1,695,427 | Helfgott | Dec. 18, 1928 |
| 1,728,064 | Johnson | Sept. 10, 1929 |

FOREIGN PATENTS

| Number | Country | Date |
|---|---|---|
| 490,075 | Great Britain | Aug. 9, 1938 |